Feb. 4, 1930. C. R. WHITE 1,745,592
OMELET PAN
Filed March 19, 1929
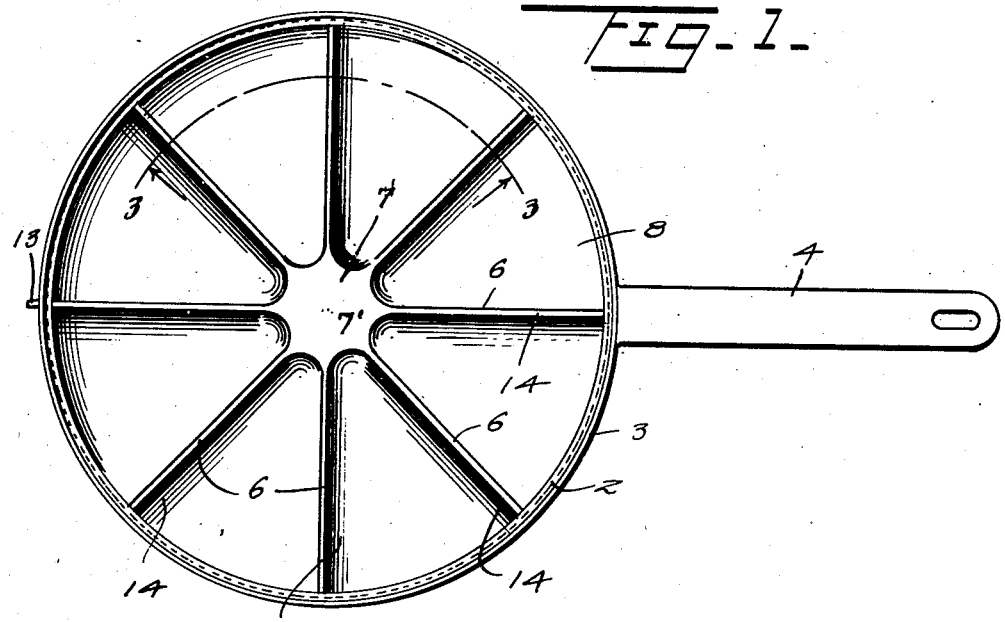
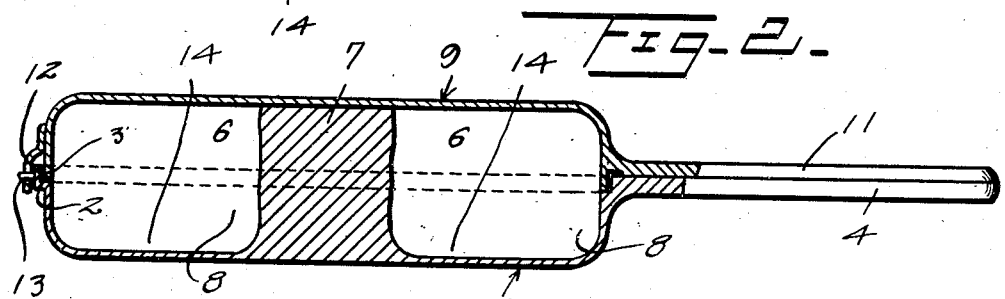
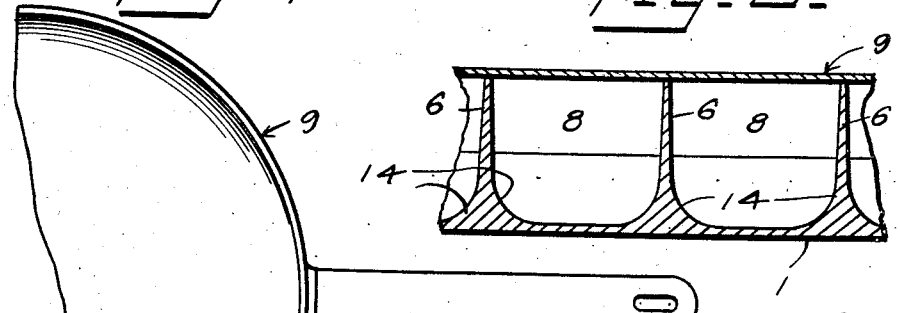
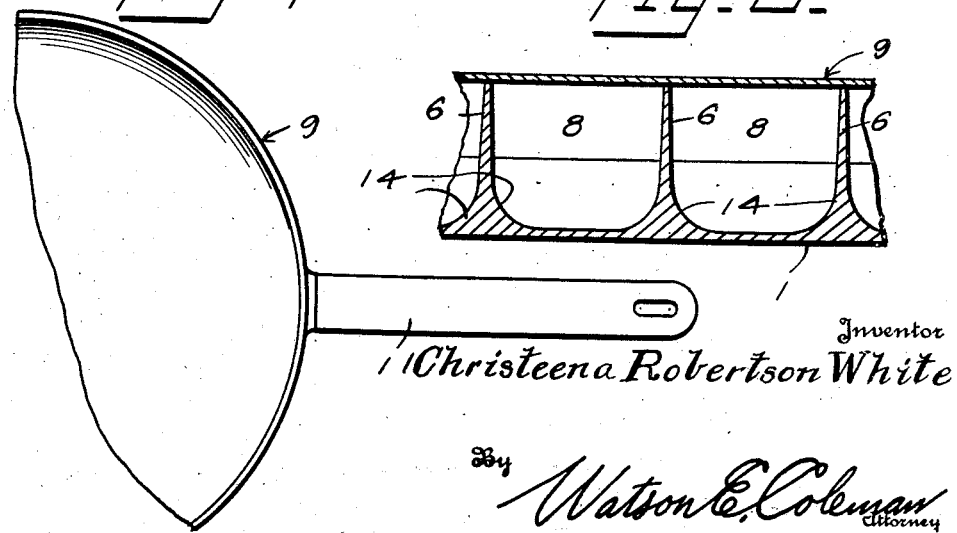
Inventor
Christeena Robertson White
By Watson E. Coleman
Attorney Patented Feb. 4, 1930

1,745,592

UNITED STATES PATENT OFFICE

CHRISTEENA ROBERTSON WHITE, OF TRYON, NORTH CAROLINA

OMELET PAN

Application filed March 19, 1929. Serial No. 348,288.

This invention relates to the class of kitchen utensils and pertains particularly to an improved omelet pan.

The primary object of this invention is to provide an improved type of omelet pan employing a top or lid portion and a bottom portion, the bottom portion having a plurality of radial partitions therein forming a series of compartments, which partitions project upwardly and fit into the top or lid when the same is in place, thus permitting after the initial heating and congealing of the individual omelets in the bottom portion, the inversion of the pan for the cooking of the other sides of the omelets in the top portion without danger of the omelets becoming mixed or escaping from the pan.

Another object of the invention is to provide an omelet pan in two portions having a means whereby the lid portion may be easily and quickly attached to and placed in position over the bottom portion and the partition members forming the sides of the several compartments therein.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a plan view of the bottom half of the cooking utensil embodying the present invention;

Figure 2 is a transverse section through the complete utensil;

Figure 3 is a sectional view taken upon the line 3—3 of Figure 1;

Figure 4 is a plan view of a portion of the top half of the utensil looking at the inner side.

Referring to the drawing in detail wherein like numerals of reference indicate corresponding parts throughout the several views, the numeral 1 indicates the bottom portion of the present omelet pan, the same being preferably of circular configuration as shown, and having the top edge provided with a laterally extending surrounding flange 2 which terminates at its outer edge in the upstanding flange 3 which is concentric with the wall of the pan part and set away or outwardly therefrom, as shown. A suitable handle 4 is formed integral with the body of the bottom in the manner shown, which handle coacts with a similarly formed handle of a type hereinafter described.

The bottom portion of the pan is provided with a series of radially directed partitions 6, the inner ends of which are formed integral with the central upstanding body 7, the apex portion of the substantially triangular compartments 8 which is formed by the partitions being rounded as indicated at 7'.

These partitions 6 extend upwardly above the top edge of the bottom portion of the pan a distance equal to the depth of the top or lid portion 9 which is designed to be inverted over the bottom portion when the pan is in use with its free edge positioned in the channel 10 which is formed between the flange 3 and the outer edges of the partition 6.

The top or lid 9 is provided with a handle 11 similar to the handle member 4 over which it positions when the complete pan is in use and diametrically opposite the handle 11 the wall of the top 9 has secured thereto the tongue 12, that end adjacent the edge of the pan standing away from the pan wall to receive between it and the pan wall the flange 3 of the bottom portion. This free end of the tongue 12 has provided an aperture through which is extended a pin 13 carried by the flange 3 of the bottom portion, in the manner shown. This prevents the accidental disengagement of the top and bottom portions of the pan when the pan is inverted.

As is clearly shown in Figure 3 the corners formed between the partitions 6 and the bottom portion 1 of the pan are rounded as indicated at 14, so that the pan may be easily and thoroughly cleaned after use.

From the foregoing description it will be readily seen in the use of this pan the spilling of the omelet or the mixing of the individual omelets will be avoided when the pan is inverted for the purpose of cooking the omelets on both sides.

In using the pan a small portion of grease is first placed in each of the compartments and the pan placed upon the stove to heat. When hot the proper amount of omelet mixture is placed in each compartment where it is cooked for approximately two and one-half minutes, after which the cover is put in place and the pan turned over and the omelet again cooked for approximately two and one-half minutes. After this the omelets are ready to be removed and they may be transferred to a suitable plate by placing the same over the compartments in the place of the pan lid and then inverting the pan to cause the omelets to drop out. In this way approximately five minutes is employed in cooking a number of omelets, whereas, in the use of a single omelet pan from fifteen to twenty minutes would be necessary to cook a single omelet.

Having thus described my invention, what I claim is:—

1. A cooking utensil of the character described, comprising a top and bottom portion each having a side wall, means formed about the edge of the side wall of one portion for receiving the edge of the side wall of the other portion, partitions within one of said portions dividing the same into a plurality of compartments, said partitions extending above the edge of the wall of the portion in which they are arranged a distance substantially equal to the depth of the other portion to snugly fit therein when the portions are placed together.

2. A cooking utensil, comprising a pair of body portions each having a side wall, the edges of the walls of the portions being designed to be brought into opposed relation, partitioning members within one of the portions designed to divide the same into a plurality of compartments, said partitions being of a height to extend snugly into the other portion, a recess formed about the edge of the partition carrying portion for the reception of the opposed edge of the other portion, handle members for the portions, and means for detachably securing the portions together at a point opposite the handle members, comprising an apertured tongue carried by and spaced at one end from one portion and a pin extending outwardly from the other portion adjacent the edge for extension through the tongue.

In testimony whereof I hereunto affix my signature.

CHRISTEENA ROBERTSON WHITE.